United States Patent [19]
Clark

[11] 4,023,897
[45] May 17, 1977

[54] OPTICS DRIVE MECHANISM
[75] Inventor: William D. Clark, Longmont, Colo.
[73] Assignee: International Business Machines Corporation, Armonk, N.Y.
[22] Filed: Jan. 28, 1976
[21] Appl. No.: 653,067
[52] U.S. Cl. .................................. 355/8; 74/37; 355/51
[51] Int. Cl.² .................................. G03G 15/30
[58] Field of Search ............... 355/8, 50, 51, 66; 74/37, 89.2, 89.21

[56] References Cited
UNITED STATES PATENTS

| | | | |
|---|---|---|---|
| 3,554,640 | 1/1971 | Hoskins | 355/8 |
| 3,736,056 | 5/1973 | Burnet et al. | 355/8 |
| 3,784,297 | 1/1974 | Ito et al. | 355/8 X |
| 3,907,422 | 9/1975 | Eppe et al. | 355/8 |

Primary Examiner—L. T. Hix
Assistant Examiner—Kenneth C. Hutchison
Attorney, Agent, or Firm—Francis A. Sirr

[57] ABSTRACT

A copier having a stationary document glass and a scanning illumination/optics mechanism. The illumination/optics mechanism reciprocates through a linear scan motion and a reverse-direction reset motion during a copy process cycle. A moving photoconductor is connected to move the scanning mechanism in a scanning direction for a first part of the photoconductor movement, and to move the mechanism in the opposite reset direction during a second part of the photoconductor movement. Rotary-to-reciprocating harmonic motion mechanism couples the photoconductor's motion to the scanning mechanism to move the mechanism through the scan and reset motion.

20 Claims, 8 Drawing Figures

OPTICS DRIVE MECHANISM

BACKGROUND AND SUMMARY OF THE INVENTION

This invention pertains to the field of electrophotographic or xerographic copying apparatus, and more specifically to apparatus of the type in which light is reflected from the surface of an original document onto a photosensitive medium in order to produce copies of the original document. Specifically, this invention pertains to such a copier wherein relative motion is provided between an illumination/optics mechanism and an original document to line-scan the original with a footprint of light and thereby line-flow a reflected image of the original onto the photosensitive medium. Known copiers of this type may provide either a stationary original document or a moving original document.

Considering, for example, a prior art copier wherein the original document is stationary, the illumination/optics mechanism is usually parked at one end of the document glass during copier standby periods. When a copy cycle is initiated, the mechanism moves across the document glass, in a scan direction, flow-scanning the original document with a line-like footprint of light. This is the mechanism's cycle. In preparation for the next copy cycle, the mechanism now reverses direction, that is, moves in the opposite reset direction, returning to its parked position.

In some copiers, it may be desirable to first move from the parked position, through the equivalent of a reset motion, followed by a return scan movement to the parked position.

This cyclic operation is usually repeated for each copy to be produced.

As can be appreciated, scanning the original document must be synchronized with imaging of the photosensitive medium, this being true whether the copier's optics devices are adjusted to produce a one-to-one copy, a magnification, or a reduction of the original document.

The prior art contains diverse teachings of mechanisms for producing this relative movement in a synchronous fashion. For the most part, however, these mechanisms are complicated and heavy. In addition, the prior art mechanisms generally fail to stop the mechanism at the end of its scan or reset stroke in a manner that is free of vibration and shock.

The present invention is directed to a harmonic motion mechanism which operates to provide constant velocity scan and reset motion, with the turnaround interval between such motions being accomplished with a minimum of vibration and shock due to harmonic motion reversal of the moving members.

The foregoing and other features and advantages of the invention will be apparent from the following more particular description of preferred embodiments of the invention, as illustrated in the accompanying drawing.

DESCRIPTION OF THE PREFERRED EMBODIMENTS

The following description relates the present invention to the environment of a drum photoconductor. However, it is recognized that the present invention finds utility with other photoconductors, such as for example belt photoconductors.

The embodiments of FIGS. 3–6 relate the present invention to a two-cycle process wherein the photoconductor drum rotates two revolutions during a copy process cycle. While the present invention has particular utility with respect thereto, its advantages and generic aspects are demonstrated by the FIGS. 7 and 8 one-cycle process embodiment.

Figure 1:
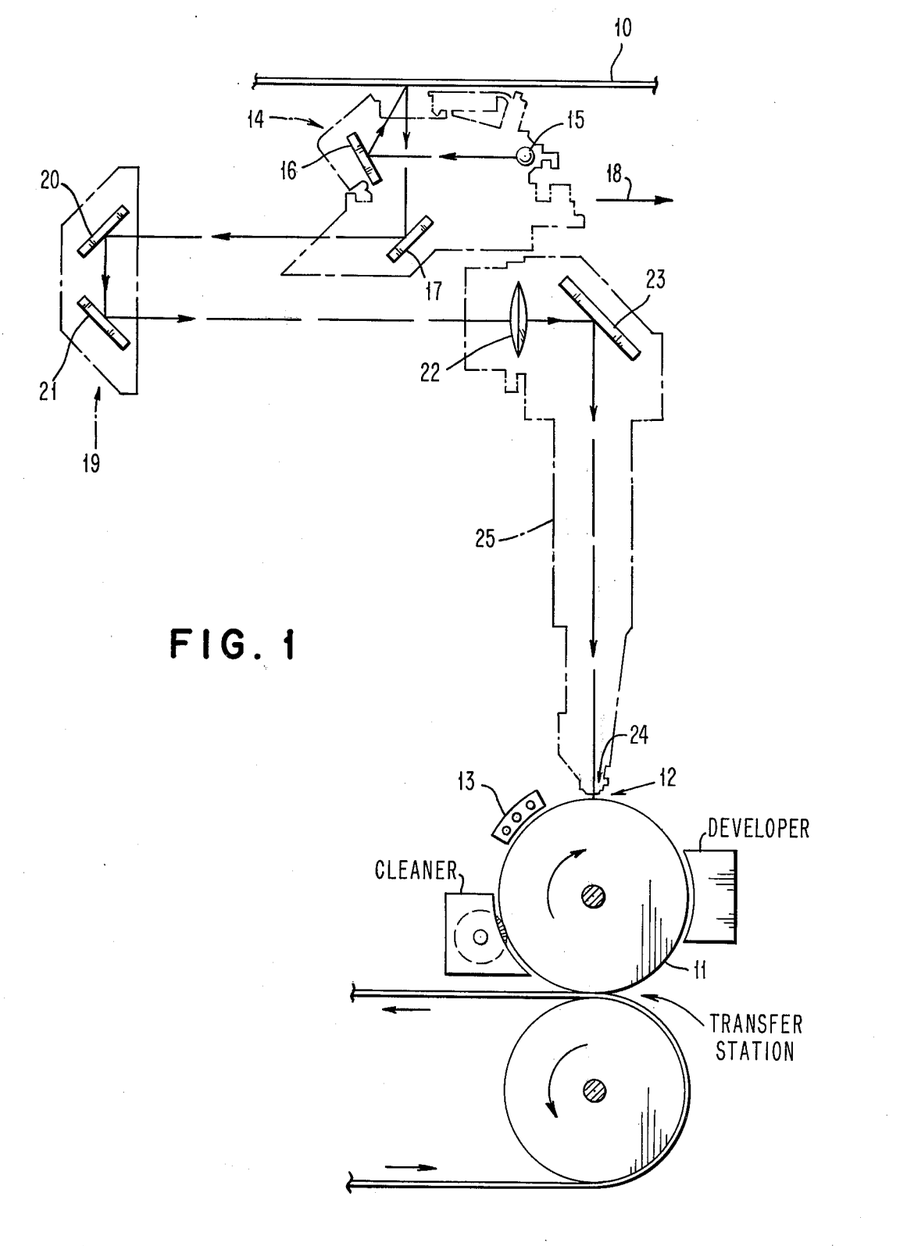
FIG. 1 is a schematic view of a scanning-type electrophotograhic copier embodying the present invention wherein the scan and reset motion direction is normal to the photoconductor drum's axis.

Referring to FIG. 1, this figure is a schematic showing of portions of a scanning electrophotographic copier embodying the present invention. Specifically, this copier, the details of which are shown as an example only, employs an electrostatic, dry, transfer process to make copies on uncoated paper. With this process, the image of original document 10 is formed as an electrostatic latent image on drum-held photoconductor 11, at imaging station 12. In order to form the photoconductor's latent image, its surface is first charged at charging station 13. Specifically, a high negative electrostatic charge is placed on the photoconductor surface as the drum rotates past a charge corona. In the dark environment, the photoconductor acts as an insulator and stores this negative charge on its surface.

When exposed to light, the photoconductor acts as a conductor, allowing the electrostatic charge stored on its surface to dissipate through the photoconductor to a conductive backing. As the photoconductor drum rotates, the photoconductor is line-scanned or exposed by the light reflected from stationary document 10.

The scanning illumination/optics mechanism of FIG. 1 supplies the light required to copy the document, and causes light to reflect from the document onto the photoconductor. This scanning mechanism is directly connected to the drum by optics drive cables, not shown.

More specifically, a first movable carriage 14 contains linear light source 15 and mirrors 16 and 17. This carriage is driven in scan direction 18 during a first cycle of the photoconductor drum. This mechanism is returned in the opposite reset direction during a second revolution of the drum. Movement of first carriage 14 is transmitted to second carriage 19, containing mirrors 20 and 21, by a coupling, not shown. This coupling is such that second carriage 19 moves in both the scan and the reset directions at one-half the speed of the first carriage, so as to maintain exactly the same optical path distance between the illuminated portion of the original document and imaging station 12 as the document is scanned.

It will be assumed for convenience that the scan movement precedes the reset movement. However, the present invention is not to be restricted thereto. For example, it may be desirable to first move the copier's illumination/optics mechanism from a parked position through a motion similar to reset, followed by return scan motion.

Carriage 14 is constructed and arranged so as to illuminate document 10 with a straight footprint of light, this footprint being perpendicular to the direction of scan 18. Thus, a flowing image of the original document is presented through lens 22, by way of mirror 23 to aperture 24. This aperture is an elongated aperture which extends parallel to the rotational axis of the photoconductor drum. The housing 25, within which lens 22, mirror 23 and aperture 24 are mounted, is stationary.

By way of example, this invention has particular utility when used with a two-cycle xerographic process such as is described in the copending application of G. L. Smith, Ser. No. 580,643, filed May 27, 1975, and commonly assigned.

Rotational movement of drum photoconductor 11 is coupled to carriage 14 by way of a harmonic motion drive coupling, such as is disclosed in FIGS. 3 and 4, or FIGS. 5 and 6, to be described.

Figure 2:
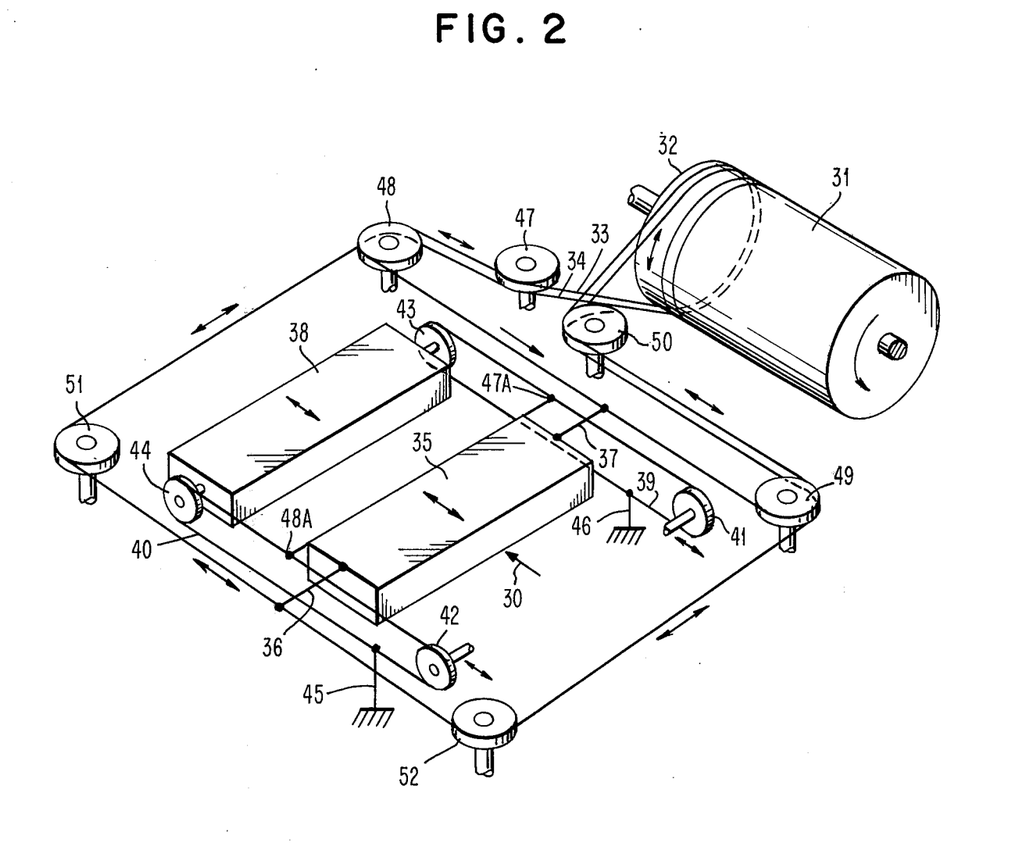
FIG. 2 is a schematic view of a scanning mechanism embodying the present invention, wherein the motion directions are parallel to the photoconductor drum's axis.

FIG. 2 is a schematic view of a scanning mechanism, embodying the present invention, wherein scan direction 30 is parallel to the axis of photoconductor drum 31. Reciprocating cable drive pulley 32 is mounted coaxially with the photoconductor drum and is coupled to reciprocate in one direction to provide scan movement during a first revolution of the drum, and to return, rotating in the opposite direction, during the second revolution of the drum. Specifically, the reciprocating movement of pulley 32 causes cables 33 and 34 to transmit motion to first carriage 35, by way of rigid links 36 and 37. As with the embodiment of FIG. 1, carriage 35 includes one mirror and an elongated light source. Second carriage 38 includes two mirrors and moves at one-half the speed of carriage 35. Carriage 38 is driven by cable loops 39 and 40, as these loops pass over movable pulleys 41, 42, 43 and 44. Pulleys 41-44 constitute a part of carriage 38, and move therewith. One point on each of the cable loops 39 and 40 is attached to the frame of the copier at stationary points 45 and 46. One point on each of these loops is also attached to the first carriage 35 at points 47A and 48A. Points 47A and 48A may be adjustable to control the position of carriage 38 with respect to carriage 35.

Each of the cables 33 and 34 have the ends thereof attached to reciprocating pulley 32. Cable 33 travels around fixed position idler pulleys 47 and 48, to the point of attachment to carriage 35, and then continues around fixed position idler pulleys 49 and 50, where the other end of the cable is attached to reciprocating pulley 32. Cable 34 is guided around pulleys 47 and 48 to a fixed position idler pulley 51, to the point of attachment to carriage 35, and then around fixed position idler pulley 52 and pulleys 49 and 50 where it is attached to reciprocating pulley 32.

During the first revolution of drum 31 pulley 32 rotates counter-clockwise and carriages 35 and 38 move generally to the left to scan the original document. During the second drum revolution pulley 32 returns in a clockwise direction, causing carriages 35 and 38 to return through a reset motion to the parked position shown in FIG. 2.

Figure 3:
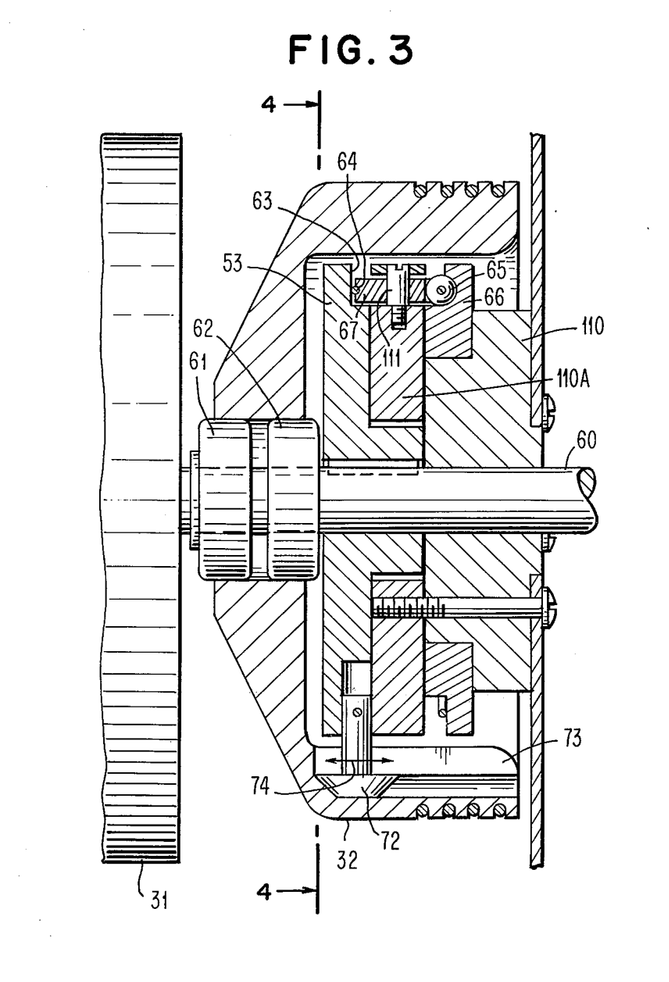
FIG. 3 is a section view of a portion of the photoconductor drum and the reciprocating pulley of FIG. 2, showing a bead-chain embodiment of the present invention.

With reference to FIG. 3, this figure discloses a specific harmonic motion drive coupling whereby rotary motion of drum 31 is transmitted to reciprocating pulley 32 to cause scan and reset reciprocation thereof during two rotational cycles of the drum. From FIG. 3 it can be seen that reciprocating pulley 32 is rotationally mounted on drum shaft 60 by way of bearings 61 and 62. Thus, pulley 32 is free to rotate about shaft 60. This drum shaft is directly connected to a drive sprocket 53, such that drive sprocket 53 makes two revolutions as drum 31 revolves through two revolutions, in a counterclockwise direction as shown in FIG. 2.

The radial face 63 of sprocket 53 includes a 360° drive surface pattern mating with an inelastic bead chain loop 64. This bead chain is preferably formed of a metal cable having a plurality of spherical beads 65 fixed thereto at equally spaced intervals. An idler sprocket 66, of identical radial surface configuration to radial face 63, freely rotates about shaft 60. Sprockets 53 and 66 are axially spaced from one another, along the axis defined by shaft 60. Sprocket 66 rotates about a bearing formed on stationary member 110. Members 110, 110A support two fixed position idler pulleys 67 and 68 on circumferentially spaced axes which extend normal to shaft 60.

Figure 4:
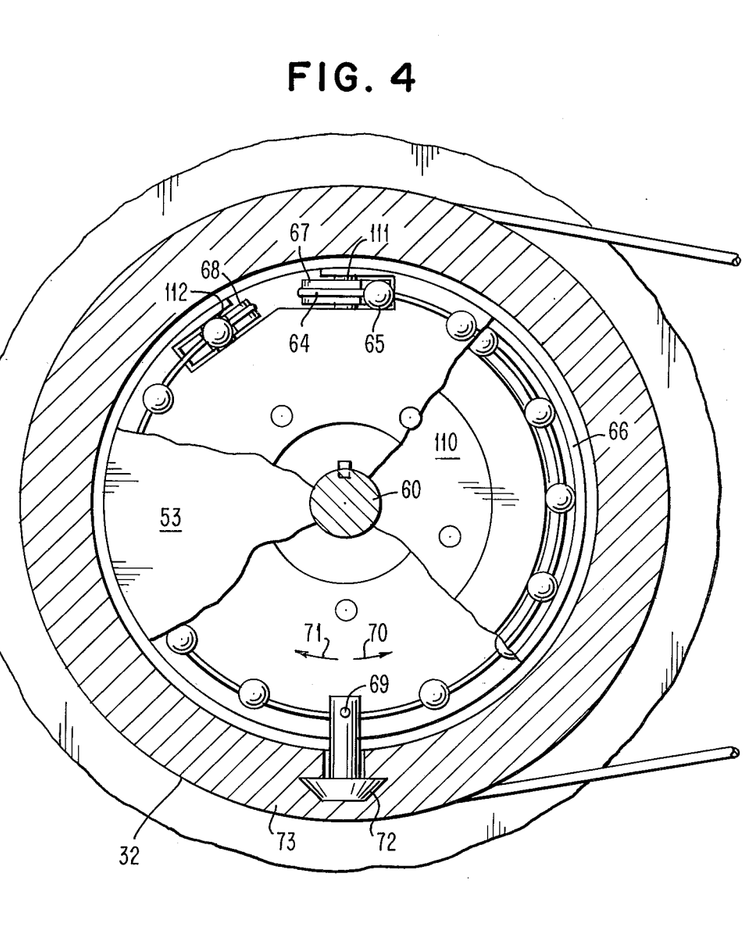
FIG. 4 is a section view of the apparatus of FIG. 3, taken along the line 4—4, and showing the drive pin which is carried by the bead chain and which operates to transmit a reciprocating drive to the reciprocating pulley.

As seen in FIG. 4, pulleys 67 and 68 freely rotate on shafts 111 and 112, respectively. Bead chain loop 64 passes around the two fixed-position idler pulleys 67 and 68, both of which are shown in FIG. 4 and only the former of which is shown in FIG. 3. Thus, the bead chain is formed into two substantially closed "C" configurations, one configuration lying in the radial surface pattern 63 of drive sprocket 53, and the other lying in the radial surface pattern of idler sprocket 66. Referring to FIG. 4, a given point 69 on the bead chain first moves in a counterclockwise direction 70 until it encounters pulley 67, whereupon point 69 moves a short distance axially of shaft 60 and returns in a clockwise direction 71 on its way toward pulley 68, whereupon its direction reverses to counterclockwise direction 70.

The input driving force for such movement is provided by the radial surface pattern of sprocket 53, as this sprocket is driven by shaft 60. Movement of sprocket 53 exerts a force on the inelastic bead chain. The bead chain in turn transmits a drive force to the radial surface pattern of sprocket 66, causing this sprocket to turn clockwise as sprocket 53 turns counterclockwise with shaft 60.

Point 69 on the bead chain is connected to drive pin 72. Thus, drive pin 72 moves integrally with the bead chain, first in a counterclockwise direction 70 adjacent the radial surface pattern of sprocket 53, until it encounters pulley 67, whereupon the drive pin moves axially of reciprocating pulley 32, in an axially extending drive slot formed therein, returning in a clockwise direction 71 adjacent the radial surface pattern of sprocket 66. Since this drive pin is carried by an axially extending drive slot which is formed in the annular flange 73 (see FIG. 3) of the reciprocating pulley, drive pin 72 operates to reciprocate pulley 32 in a counterclockwise direction and then in a clockwise direction. Drive pin 72 also moves axially relative to the pulley, as shown by arrow 74.

Figure 5:
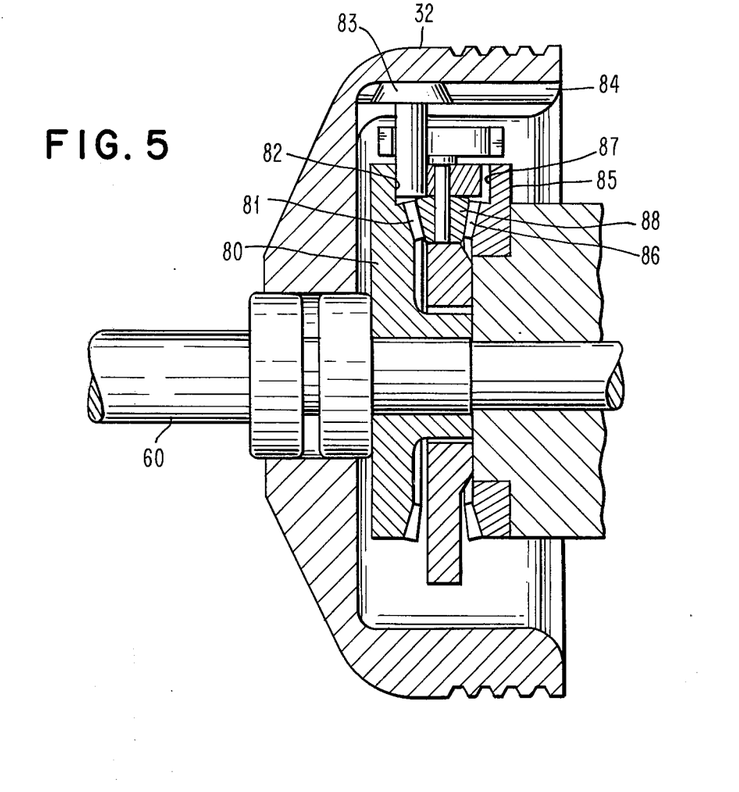
FIG. 5 is a section view like FIG. 3 wherein the drive and idler sprockets contain a surface configuration into which the reciprocating pulley's drive pin fits, and wherein the drive sprocket drives the idler sprocket by way of gears.

FIG. 5 is a section view, somewhat like FIG. 3, wherein the drive and idler sprockets contain different surface patterns, such that the reciprocating pulley's drive pin is directly driven by the surface pattern of the drive and idler sprockets, without the use of an intermediary such as the bead chain of FIG. 3.

Specifically, drive sprocket 80 includes a ring gear 81 and one half-round surface pattern 82 which receives drive pin 83. Drive pin 83 is free to slide axially within the drive slot 84 formed in reciprocating pulley 32. Idler sprocket 85 includes a similar ring gear 86 and one similar half-round surface pattern 87 to receive drive pin 83. Two idler gears, circumferentially positioned similar to idler pulleys 67 and 68 of FIG. 4, are positioned to be driven by ring gear 81.

Figure 6:
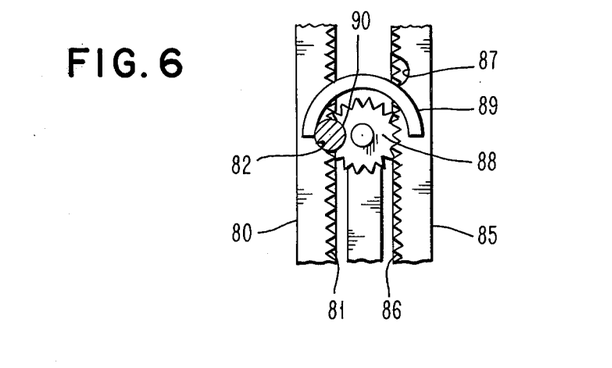
FIG. 6 is a view of one of the two turnaround gears of FIG. 5.

One of these idler gears 88 is shown in FIGS. 5 and 6. As pin 83 moves in a clockwise direction with idler sprocket 85, the pin is carried to stationary turnaround guide 89 by the drive surface pattern 87 formed in idler sprocket 85 (see FIG. 6). Idler gear 88, which is driven by ring gear 81 and transmits a clockwise drive force to ring gear 86, also includes a single drive surface pattern 90 adapted to receive the shaft of drive pin 83, as shown in FIG. 6. The drive of idler gear 88 is synchronized such that patterns 87 and 90 line-up to receive pin 82 when the pin arrives at the right-hand beginning of guide 89. As the pin continues its clockwise movement, turnaround guide 89 operates to cause the pin to remain in surface pattern 90, as it leaves pattern 87. By the time the drive pin has completed its turnaround, drive pattern 82 formed in drive sprocket 80 has synchronously moved into position to receive the shaft of the drive pin, and the drive pin then returns in a counterclockwise direction, as shaft 60 and the drum continue through a second revolution in a counterclockwise direction.

In summary, ring gear 81 drives ring gear 86 through the two idler gears. Each idler gear carries a surface pattern 90 which synchronously aligns itself with the surface pattern in that sprocket which is currently carrying the drive pin, as the drive pin arrives at a turnaround point. A turnaround guide 89 then cooperates with the idler gear's surface pattern to transfer the drive pin from one sprocket to the other, whereupon the drive pin returns in the opposite direction.

As can be appreciated, ring gears 81 and 86 and the two cooperating idler gears, which serve the purpose of accomplishing turnaround of the drive pin, replace the bead chain of the embodiment shown in FIGS. 3 and 4.

In the two foregoing embodiments of the present invention, counterclockwise movement of the drive pin produces a first direction movement of the illumination/optics apparatus, and clockwise movement of this pin produces an opposite direction movement of the mechanism. These two movements are at a constant velocity. The pin's turnaround movement, during which the drive pin stops and reverses direction, is a symmetrical harmonic movement.

It may be desirable to provide the required scan and reset movement of the copier's illumination/optics apparatus during one revolution of the associated drum.

Figure 7:
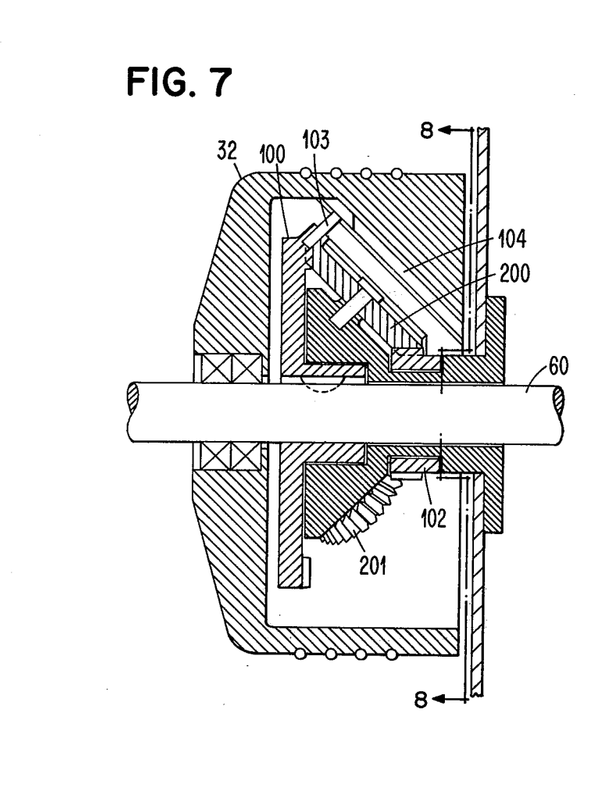
FIGS. 7 and 8 are views of an embodiment of the present invention wherein the copier's illumination/optics apparatus is moved through the scan and reset cycle with one revolution of the associated photoconductor drum.
Figure 8:
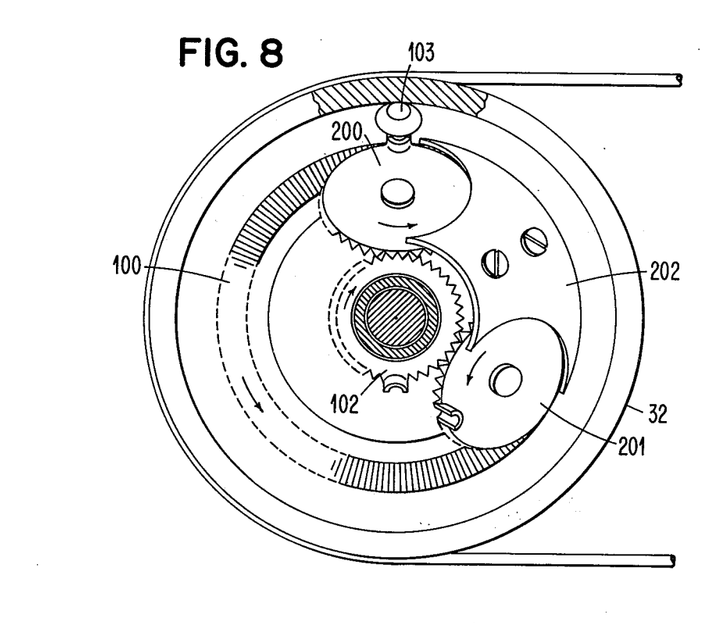

FIGS. 7 and 8 show an embodiment of the present invention which accomplishes this result. Here again, the drive sprocket 100 is directly coupled to drum shaft 60. In this arrangement, however, the two idler gears 200 and 201 are mounted on circumferentially spaced axes which are inclined to the axes defined by shaft 60. As with FIGS. 5 and 6, these idler gears are driven by a ring gear carried by drive sprocket 100 and transmit a drive force to a ring gear carried by idler sprocket 102. The ring gear carried by drive sprocket 10 is of a larger diameter than is the ring gear carried by an idler sprocket.

Drive pin 103 moves in a slot 104 formed in reciprocating pulley 32. This slot is inclined to the axes of shaft 60, and is normal to the rotational axes of the two idler gears 200 and 201. As shaft 60 rotates counterclockwise, drive sprocket 100 is driven in a counterclockwise direction and the two idler gears transmit a driving force to idler sprocket 102, causing it to rotate in a clockwise direction. Due to the different pitch diameters of the ring gears formed in sprockets 10 and 102, the rotary gear speed of sprocket 102 is higher than that of drive sprocket 100.

Drive pin 103 is adapted to be carried first by drive sprocket 100, and then by the idler sprocket 102, by virtue of half-round surface patterns similar to 82 and 87, shown in FIG. 6. As a result, the drive pin first moves in a counterclockwise direction at one speed, and then in a clockwise direction at a higher speed. When idler gear 201 is encountered at the end of the pin's counterclockwise motion, pin 103 moves axially of shaft 60, and radially inward, toward shaft 60, as it follows slot 104. This movement is accomplished by a half-round surface pattern and turnaround guide similar to 90 and 89, respectively, of FIG. 6. As will be appreciated, the pin's turnaround movement is, in this case, nonsymmetrical harmonic motion since the drive pin reduces in speed from a low constant speed during counterclockwise movement, when it is driven by drive sprocket 100, to a stopped condition in the middle of its turnaround movement, and then accelerates to a higher constant speed as the pin is carried in the clockwise direction by the idler sprocket's drive surface configuration.

The arrangement of FIGS. 7 and 8 may be desirable wherein the lower speed movement of the drive pin and reciporating pulley 32 is connected to the copier's illumination/optics mechanism to provide scan of the original document. During the scan movement, the photoconductor's latent image is formed. The drive pin's subsequent higher speed movement causes the illumination/optics mechansim to be quickly reset, as shaft 60 rotates through less than one-half revolution. In this manner, in a single drum revolution, the major portion of the drum's surface is devoted to the scanning of a photoconductor, and a relatively small portion of the drum's surface is devoted to resetting the copier's illumination/optics apparatus. The gear diameters formed in sprockets 100 and 102 are in the ratio of four-to-one.

While the invention has been particularly shown and described with reference to preferred embodiments thereof, it will be understood by those skilled in the art that various changes in form and details may be made therein without departing from the spirit and scope of the invention.

What is claimed is:

1. In a copying machine of the type having a document support and an illumination source which reciprocate relative to each other, a photoconductor surface movable in a cyclic path, and a drive coupling for synchronizing said relative movement to said surface movement, comprising:
   drive means for moving said surface in one direction,
   a drive sprocket connected to said drive means and operable to rotate about an axis,
   an idler sprocket mounted coaxially with said drive sprocket and free to rotate as an idler,
   timing means mounted intermediate said sprockets so as to be driven by said drive sprocket and to transmit a driving force to said idler sprocket, said timing means including two rotatable members mounted to rotate on fixed axes, said members causing said sprockets to rotate in opposite directions,
   a drive surface pattern formed in each of said sprockets,
   a pin adapted to cooperate with the drive surface patterns in said sprockets so as to follow a first arcuate path concomitant with the drive surface pattern in said drive sprocket, and to follow a second arcuate path in the opposite direction concomitant with the drive surface pattern in said idler sprocket, said timing means being operable to synchronize operation of said timing means and said sprockets to translate said pin between said arcuate paths, and
   means connecting said pin to effect said relative movement.

2. A copying machine as defined in claim 1 wherein said timing means two rotatable members each include a drive surface pattern whereby said members operate to translate said pin between the drive surface pattern of one sprocket and the drive surface pattern of the other sprocket.

3. A copying machine as defined in claim 2 wherein said timing means includes an endless loop bead chain which is formed into two C-shaped sectors which are joined at said two rotatable members, said drive sprocket and said idler sprocket both having an annular surface pattern which receives said bead chain and causes said bead chain to transmit a drive force from said drive sprocket to said idler sprocket.

4. A copying machine as defined in claim 3 wherein said pin is connected to said bead chain.

5. A copying machine as defined in claim 4 wherein said photoconductor surface is in the form of a drum which rotates about said axis.

6. A copying machine as defined in claim 5 wherein said timing means two rotatable members are mounted on axes which are normal to the axis about which said drive and idler sprockets rotate, and wherein said annular sprocket surface patterns are coaxial with said axis and are of the same diameter.

7. A copying machine as defined in claim 2 wherein said drive sprocket and said idler sprocket both have an annular ring gear pattern, and wherein said timing means two rotatable members each include an idler gear pattern whereby a drive force is transmitted from said drive sprocket to said idler sprocket.

8. A copying machine as defined in claim 7 wherein said annular ring gear patterns are coaxial, and wherein one of said ring gear patterns is of a smaller diameter than the other, such that said relative movement is of a higher speed in one direction.

9. A copying machine as defined in claim 8 wherein said photoconductor surface is in the form of a drum which rotates about said axis.

10. In a copying machine of the type having a document support and an optics mechanism which reciprocate one relative to the other, a photoconductor surface movable in a cyclic path, and a drive coupling for synchronizing said relative movements, the drive coupling comprising:
    drive means for moving said photoconductor surface in one direction,
    a drive sprocket connected to be driven in one direction about an axis by said drive means,
    an idler sprocket mounted in spaced relation and coaxially with said drive sprocket and free to rotate as an idler,
    synchronizing coupling means connecting said drive sprocket in driving relation to said idler sprocket to cause said idler sprocket to rotate in an opposite direction about said axis,
    said coupling means including two rotatable members mounted to rotate on fixed axes intermediate said sprockets,
    pin means cooperating with said drive and idler sprockets and said two rotatable members, to be driven in sequence by said drive sprocket, one of said rotatable members, said idler sprocket and the other of said rotatable members, said pin means thereby following a reciprocating arcuate path, and
    means connecting said pin to effect relative reciprocation of one of said document support or optics mechanism.

11. A copying machine as defined in claim 10 wherein said pin means cooperates with one of said sprockets at a relatively large radius from said axis, and cooperates with the other of said sprockets at a smaller radius from said axis, such that said relative reciprocation is velocity nonsymmetrical with constant velocity rotation of said drive sprocket.

12. A copying machine as defined in claim 11 wherein said photoconductor surface is in the form of a drum which rotates about said axis and is driven at the same velocity as said drive sprocket.

13. A copying machine as defined in claim 10 wherein said synchronizing drive means includes an endless bead chain coupling said drive sprocket to said idler sprocket.

14. A copying machine as defined in claim 13 wherein said photoconductor surface is in the form of a drum which rotates about said axis at the same velocity as said drive sprocket.

15. A copying machine as defined in claim 10 wherein said drive and idler sprocket both include facing ring gears, and wherein said two rotatable members comprise timing gears coupling said ring gears.

16. A copying machine as defined in claim 15 wherein said photoconductor surface is in the form of a drum which rotates about said axis at the same velocity as said drive sprocket.

17. A copying machine of the type having a document illumination/optics mechanism which reciprocates during a copy cycle, a photoconductor surface movable in a cyclic path, and a drive coupling for synchronizing said mechanism movement to said surface movement, comprising:
    drive means for moving said surface in one direction,
    a drive sprocket connected to rotate as a result of said surface movement, an idler sprocket spaced from and mounted coaxially with said drive sprocket, two rotatable members mounted to rotate on fixed axes intermediate said sprockets, means including said two rotatable members continuously connecting said drive sprocket to said idler sprocket, arcuately reciprocating means connected in sequence to said drive sprocket, one of said rotatable means, said idler sprocket, and the other of said rotatable means, and means connecting said reciprocating means to effect movement of said mechanism.

18. A copying machine as defined in claim 17 wherein said two rotatable means comprise two idler pulleys, and including a continuous inelastic bead chain having a first arcuate portion driven by said sprocket, a second arcuate portion in driving engagement with said idler sprocket, the ends of said arcuate portions being joined at said idler pulleys, said idler pulleys, said arcuate reciprocating means comprising a point on said bead chain.

19. A copying machine as defined in claim 18 wherein said photoconductor surface is in the form of a drum which rotates coaxially with said drive sprocket.

20. A copying machine as defined in claim 17 wherein said drive and idler sprockets include facing ring gears, and wherein said two rotatable means comprise two idler gears coupling said ring gears.

* * * * *